(12) United States Patent  (10) Patent No.: US 6,854,255 B1
Emerson  (45) Date of Patent: Feb. 15, 2005

(54) BERRY HARVESTER (76) Inventor: Zane Emerson, P.O. Box 5, Columbia Falls, ME (US) 04623

( * ) Notice: Subject to any disclaimer, the term of this patent is extended or adjusted under 35 U.S.C. 154(b) by 0 days.

(21) Appl. No.: 10/656,723

(22) Filed: Sep. 5, 2003

(51) Int. Cl.$^7$ .............................................. A01D 46/00
(52) U.S. Cl. ...................................................... 56/330
(58) Field of Search ........................... 56/327.1, 328.1, 56/330, 16.4, 16.5, 16.6; 171/27; 172/21, 22, 40, 42

(56) References Cited

U.S. PATENT DOCUMENTS

| | | |
|---|---|---|
| 408,414 A | 8/1889 | Jenney |
| 425,299 A | 4/1890 | Carpenter et al. |
| 520,054 A | 5/1894 | Horton |
| 541,307 A | 6/1895 | Bassett et al. |
| 546,777 A | 9/1895 | Hasey |
| 634,735 A | 10/1899 | Lane et al. |
| 654,013 A | 7/1900 | Lumbert |
| 924,552 A | 6/1909 | Holmes |
| 1,122,802 A | 12/1914 | Quantrell |
| 1,143,403 A | 6/1915 | Keene |
| 1,315,095 A | 9/1919 | Coon |
| 1,354,283 A | 9/1920 | Clapp |
| 1,360,473 A | 11/1920 | Turner et al. |
| 1,452,629 A | 4/1923 | Veeder |
| 2,037,624 A | 4/1936 | Franklin |
| 2,355,273 A | 8/1944 | Case |
| 2,459,471 A | 1/1949 | Tebbetts |
| 2,664,692 A | 1/1954 | Darlington |
| 2,696,706 A | 12/1954 | Getsinger |
| 2,780,905 A | 2/1957 | Darlington |
| 2,795,099 A | 6/1957 | Getsinger |
| 2,915,871 A | 12/1959 | Furford |
| 4,294,063 A | * 10/1981 | Bianchi .................... 56/16.4 R |
| 5,881,544 A | * 3/1999 | Furford ....................... 56/330 |
| 6,105,352 A | * 8/2000 | Tremblay et al. ............. 56/330 |

* cited by examiner

Primary Examiner—Robert E Pezzuto
(74) Attorney, Agent, or Firm—Patricia M. Mathers; Thomas L. Bohan (57) ABSTRACT Apparatus for raking berries, particularly blueberries. The apparatus has a frame supported on wheels, a rake head, a berry conveyor, support for a berry box, and a side support for stacking additional empty berry boxes. The motor-driven apparatus provides independent operation of ground travel and berry collecting operation. The rakes maintain a constant orientation relative to the vertical throughout the rotation of the rake head.

8 Claims, 6 Drawing Sheets

BERRY HARVESTER

BACKGROUND INFORMATION

1. Field of the Invention

The invention relates to the field of harvesting berry harvesters. More particularly, the invention relates to a walk-behind harvester. More particularly yet, the invention relates to blueberry harvester for use in small-scale fields.

2. Description of the Prior Art

Blueberry harvesting has traditionally been done by handpickers or rakers who walk along a row and rake through the bushes. The work is tedious and back-breaking, particularly when harvesting wild blueberries, as the bushes are low to the ground and the picker works in a bent-over position. Handpickers, being paid by the box of berries picked, often leave berries hanging on the bush if they feel that the amount of berries is meager, and wander on to more lucrative areas, resulting in a loss to the landowner.

Many attempts have been made to construct a mechanical harvester to rake blueberry bushes in a manner that removes all or most of the berries, without damaging the bush. In addition to raking the berries from the bush, the harvester also has to transport the berries into a container. Other considerations for a mechanical harvester are that it have a motorized ground travel, be lightweight enough not create ruts in the ground, and be safe to operate.

The prior art discloses many walk-behind harvesting machines, designed primarily for harvesting cranberries. Because these harvesters must travel over sandy bog, good traction on sandy ground is a major concern. For that reason, they are heavy and have drive rollers that extend across the width of the harvester and that roll right over the vines. The berry-harvesting head of these harvesters has a system of rotating rakes and a pruning mechanism. The rotating rakes lift the cranberry vines from the ground and collect the berries onto the rakes, and simultaneously, the pruning mechanism prunes the vines. The machines are heavy and cumbersome and require extensive adaptation if they are to be used in blueberry fields. Also, due to the density of cranberries on the vines, the harvesting head rotates at a speed that is too slow for efficient blueberry raking. A typical conventional cranberry harvester that has, in the past, been used in blueberry fields is the Darlington harvester as disclosed in U.S. Pat. No. 2,780,905 (1957). The Darlington harvester picks only about 100–150 boxes of blueberries in a day, not much more than a handpicker. It is not possible to adapt the speed of the head to blueberry raking conditions because the mechanical action controlling the rakes through a rotation of the head is complex, and increasing the speed results in serious damage to the harvesting head. Furthermore, the diameter of harvesting head of the Darlington machine is too small for effective blueberry raking. For example, as a result of the small diameter, when the rakes come down into the blueberry bush, they are below the top of the bush and, therefore, they miss the blueberries growing in the upper portion of the bush.

An additional disadvantage of the Darlington harvester is that it does not have a safety shut-off that effectively shuts off the harvester when the operator relinquishes control. The harvester is only switched off when the off switch is actuated. This presents a safety hazard to the operator and to others working nearby in the field, and a source of property damage to the owner of the blueberry fields, because it will continue on in ground travel even after the operator has completely let go of it. For safety reasons, it is critical that, when the operator relinquish control of the machine, it shut down immediately.

What is needed, therefore, is a walk-behind berry harvester that is lightweight and easily maneuverable. What is further needed is such a harvester that effectively removes berries from a bush and transports the berries to a container, without damaging the bush or the berries. What is yet further needed is such a harvester that is operable at speeds that are determined by the harvesting conditions of the bushes in a section of a field. What is still yet further needed is such a harvester that is safe to operate.

BRIEF SUMMARY OF THE INVENTION

For the reasons cited above, it is an object of the present invention to provide a berry harvester that is lightweight and easily maneuverable. It is a further object to provide such a harvester that effectively rakes berries from a bush and deposits the berries in a container provided on the harvester. It is a yet further object to provide such a harvester that is operable at various speeds, adaptable to the berry harvesting conditions in a particular field or area of the field. What is still yet further needed is such a harvester on which the ground travel will shut off automatically when the operator relinquishes control of the harvester.

The objects of the invention are achieved by providing a walk-behind berry harvester having a rotatable rake head, a conveyor, and a single drive means for controlling the travel speed of the harvester and the conveyor, the speed of rotation of the rake head. The harvester according to the invention is suitable for raking any type of berry that grows on a relatively low bush. The application that was initially envisioned for the harvester according to the invention was that of a blueberry harvester, and thus, reference is often made herein to blueberries. It should be understood, however, the term "blueberry" is representative of any type of berry that can be raked from a bush.

The berry harvester according to the invention is a walk-behind wheeled vehicle, with a rock guard extending from the forward end of the harvester, close to the ground, and a rake head mounted on the frame of the vehicle above the rock guard. A conveyor is mounted rearward of the rake head, and a container support rearward of the conveyor. The wheels, the conveyor, and the rake head are driven by a motor mounted on the frame of the harvester. Control devices that control the drive mechanisms for the wheels and rake head are mounted on a handle. The operator of the harvester can independently switch the ground travel and/or the rake head on or off. The drive for the conveyor is coupled with that of the rake head. Thus, when drive for the rake head is enabled, the conveyor is operating. The speed of rotation of the rake head is linked to the ground travel speed of the harvester, as is the speed of the conveyor. When in operation, the rake head rotates through the bushes and rakes up berries. The berries are flung from the rakes into a conveyor, which carries them away and drops them into a berry container that is provided beneath the upper edge of the conveyor. A mount for additional berry containers is provided on the frame, for easy access by the operator.

The heart of the invention is the rake head, which extends across the entire forward end of the harvester. The rake head comprises a rake-head shaft with flanges mounted at each end. A plurality of rakes or combs are mounted on the flanges and extend parallel to the rake-head shaft, evenly spaced on the flanges, equidistant from the rake-head shaft. Thus, as the rake head rotates, each individual rake travels through a circular path defined by its distance from the rake-head shaft. Each individual rake includes a rake bar that contains a row of teeth. Each rake is rotatably mounted on the rake head and the rotation of the rake is controlled so that it maintains a particular orientation throughout a complete rotation of the rake head. In the harvester according to the present invention, the orientation is a sloping downward angle, relative to the vertical, to facilitate discharge of the berries from the rake. As the harvester travels forward, the rotation direction of the forward edge of the rake head is in the direction of travel and the rake at the forward edge is travelling through a downward arc around the forward edge of the rake head. As the rake head rotates, it brings that rake down into the blueberry bush from above and draws it through the bush, from the forward side of the bush, relative to the direction of travel of the harvester, to the rearward side, collecting raked berries on the rake. As the rake head continues to rotate, that rake reverses its direction of travel, now traveling through an upward arc. The raked berries that are collected on the rake are then flung from the rake onto the conveyor, which transports them upward and drops them into a berry collection box. Ideally, the diameter of the rake head is large enough so that the individual rake, as it rotates through the highest point in the rotation cycle, comes down toward the bush and enters at the top of the bush.

The conveyor is an endless conveyor that travels upward away from a lower section of the rake head toward the rear of the harvester. The uppermost part of the conveyor extends rearward over a berry collection box that is supported on the frame beneath it. The conveyor collects the berries as they are flung from the individual rake and dumps them into the berry collection box as the particular section of conveyor passes the highest point of the conveyor and begins its downward travel.

A single drive means with a main drive shaft provides the power to drive the wheels of the harvester, the conveyor, the rake head and the individual rakes. Power is applied simultaneously or selectively to the wheels and/or the rake head and conveyor. It is sometimes desirable to selectively apply power to the conveyor when the harvester is at a standstill, for example, when berry raking is completed, but some berries are have not completed the travel into the berry collection box. For this reason, the single drive means allows the operator to selectively apply power to the conveyor and the rake head, but not to the wheels, and vice versa. Thus, it is possible to operate the rake head and conveyor when the harvester is not traveling forward and also to drive the harvester forward without operating the conveyor.

This selective application of power is accomplished by a two-belt drive system, with both belts driven by the main drive shaft. The belt pulley for the drive wheels is mounted directly on the shaft; the belt pulley for the rake head and conveyor is mounted on a bushing. The drive wheel pulley and the bushing for the rake head spin idly on the shaft when the respective belt is not tightened. Power is applied to the respective belt by tightening the belt. The harvester is provided with operator handles for maneuvering the harvester. A lever is provided on each handle that controls a belt tightener. Thus, one handle has a lever for tightening the belt around the drive wheel pulley; the other handle a lever for tightening the belt around the rake head pulley. By gripping both handles and levers, drive is applied to both the drive wheels and the rake head and conveyor. By releasing one or the other lever, the corresponding belt is loosened and, depending on the particular setup, the corresponding pulley then spins idly about the main drive shaft (which is still being driven by the motor).

During normal operation, the rake head and the individual rakes rotate at a speed that is relative to the speed of the ground travel, that is, the head makes one complete rotation over a certain distance of ground travel. Thus, if the harvester is traveling forward at a rapid rate, the head and the rakes rotate at a correspondingly rapid rate. Similarly, if the harvester is traveling forward at a slow rate, the head and rakes rotate at a correspondingly slow rate. Control of the rate of rotation of the rake head and the rakes is provided by a suitable mechanical system, such as a planetary gear system or an analogous chain and sprocket assembly. A central gear or sprocket, referred to hereinafter as a rake-head gear, is mounted at one end of the central head shaft. A planetary gear or sprocket, referred to hereinafter as a rake drive means, is mounted at the end of each individual rake and chains or gears that mesh with the rake-head gear couple the individual rake with the central head shaft. A belt-pulley link is provided between the rake head and the conveyor. The rake-head drive means, as mentioned above, is a belt-pulley drive mounted on the main drive shaft and coupled with a pulley on the central head shaft. Assuming the rake-head drive belt is tightened, as the main drive shaft rotates, the conveyor and the central head shaft, as well as the individual rakes, are in operation.

An additional useful feature of the apparatus according to the invention is a supplemental-box mount that is provided on the frame. The berry boxes used for collecting berries have a particular standardized contour on the bottom, which allows the boxes to be stacked. The supplemental-box mount is a support bar that is adapted to receive and securely support a berry box in a manner that does not interfere with operation of the harvester, yet provides convenient access to the operator. Several boxes are stackable on the supplemental-box mount. This allows the operator to fill a box and deposit it for pick-up, and to quickly replace it with an empty berry box so that raking can continue with a minimum of interruption. This is of advantage to harvester operators, because conventional harvesters do not allow them to carry along extra berry boxes and they normally have to return to some particular location at the perimeter of the field to deposit the filled berry box and pick up an empty box. This may be time-consuming if the harvester operator is in the middle of a large field when the berry box is full.

DETAILED DESCRIPTION OF THE INVENTION

Figure 1:
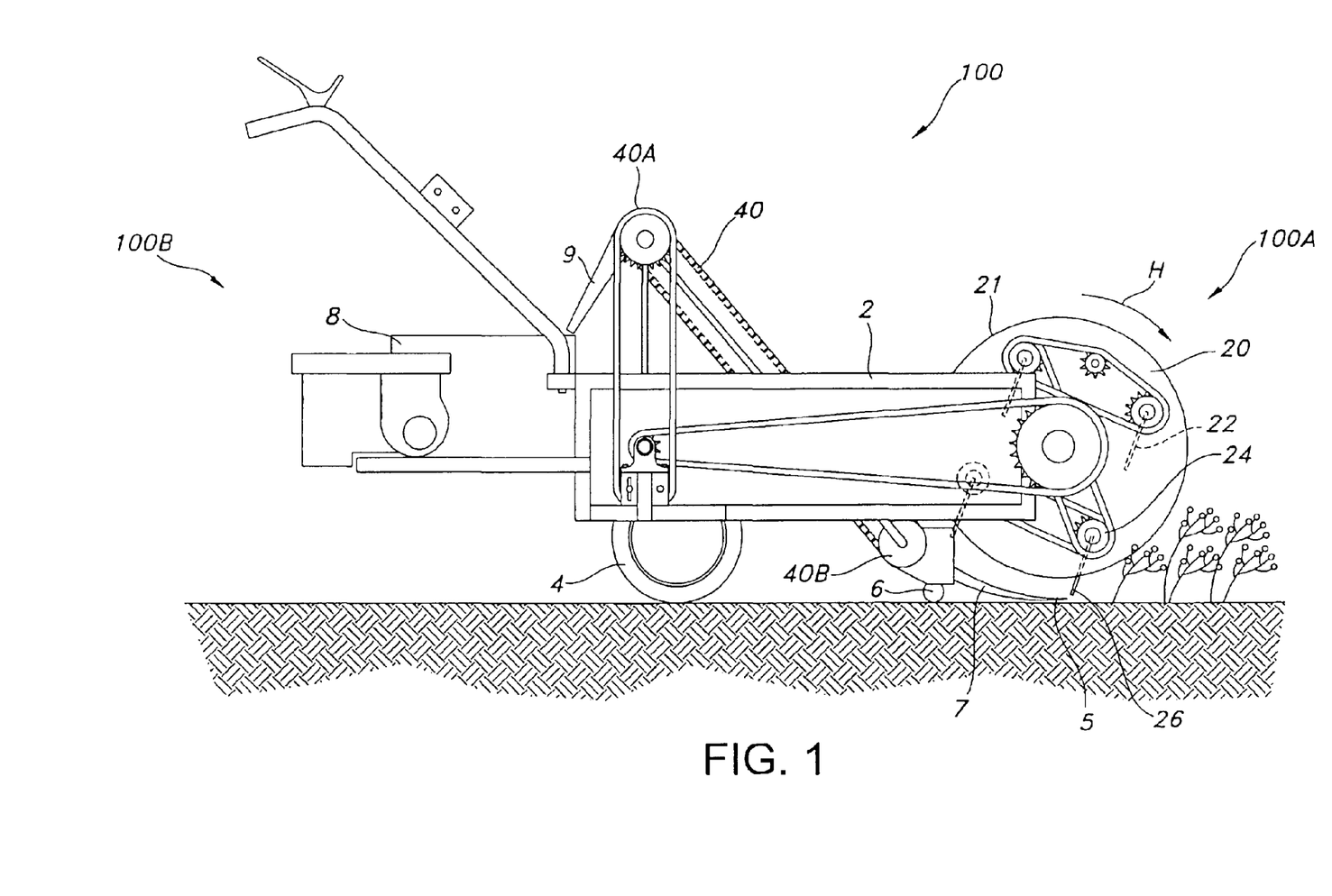
FIG. 1 is a perspective view of the apparatus according to the invention.

FIG. 1 is a schematic illustration of the major components of a walk-behind berry harvester 100 according to the invention. A forward end of the harvester 100 is designated as 100A, and a rearward end as 100B. The berry harvester 100 comprises a rake head 20 and a conveyor system 40, both of which are mounted on a frame 2. The rake head 20 comprises one or more rakes 22. The drive system will be discussed in detail below, but for now, understand that the harvester 100 is propelled forward on motor-driven drive wheels 4. Also mounted on the frame 2 at the forward end 100A beneath the rake head 20 is a rock guard 5. Just above the upper edge of the rock guard 5 is a baffle 7 that curves rearward and upward toward a lower end 40B of the conveyor 40. Both the rock guard 5 and the baffle 7 have a curvature that corresponds to that of the outer perimeter 21 of the rake head 20. Beneath the baffle 7 is a ground roller 6 that rolls along the ground surface G. A support area 8 for a berry collection box B is provided at the rearward end 100B of the harvester 100 and a chute 9 is mounted between an upper end 40A of the conveyor 40 and the berry collection box B. As the harvester 100 travels across the ground G in berry harvesting mode, the rake head 20 rotates in the direction indicated by head rotation arrow H, scoops berries from the bushes and drops them onto the conveyor 40, which carries them upward and drops them over the upper end 40A of the conveyor so that they land in the berry collection box B. The rock guard 5 protects the rake head 20 from hitting rocks and the baffle 7 serves to collect stray berries that don't make it onto the conveyor 40 when they are initially dropped from the rake 22. The stray berries are then picked up the by next following rake 22.

Figure 2:
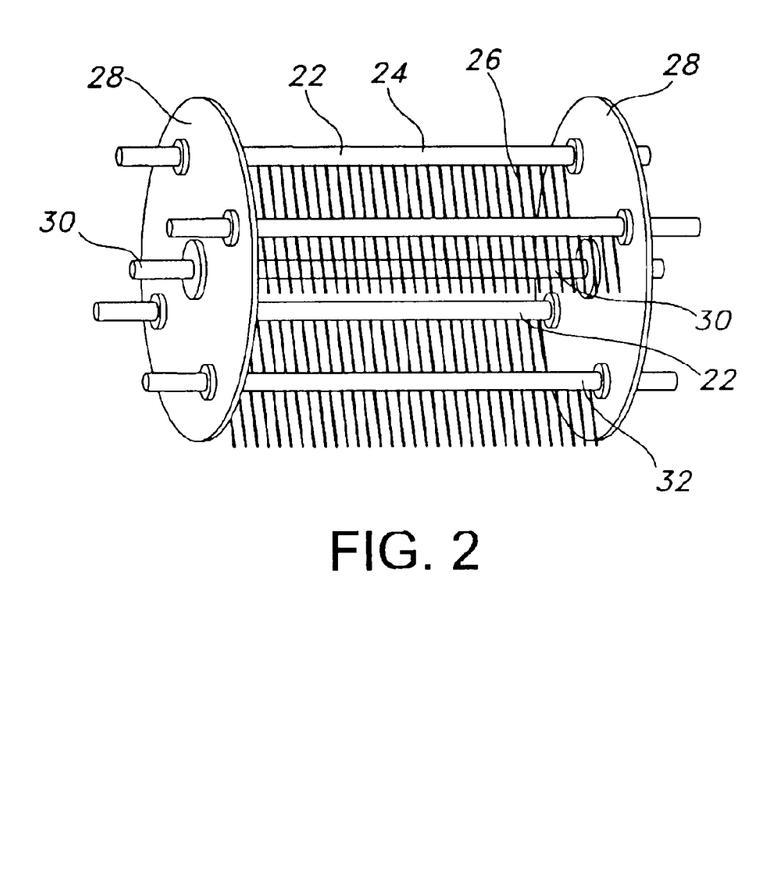
FIG. 2 is a perspective view of the rake head.

FIG. 2 is a perspective view of the rake head 20 ready for assembly onto the harvester 100. The rake head 20 is bounded at each end by a head flange 28. Extending between the two head flanges 28 are a center head shaft 30 and, in the embodiment shown, four rakes 22, each rake 22 constructed of a rake bar 24 having a plurality of rake teeth 26. Depending on the ideal speed with which the harvester 100 is setup to run, any number of rakes 22, including one rake 22, may be assembled on the rake head 20 for most efficient operation of the harvester 100.

Figure 3A:
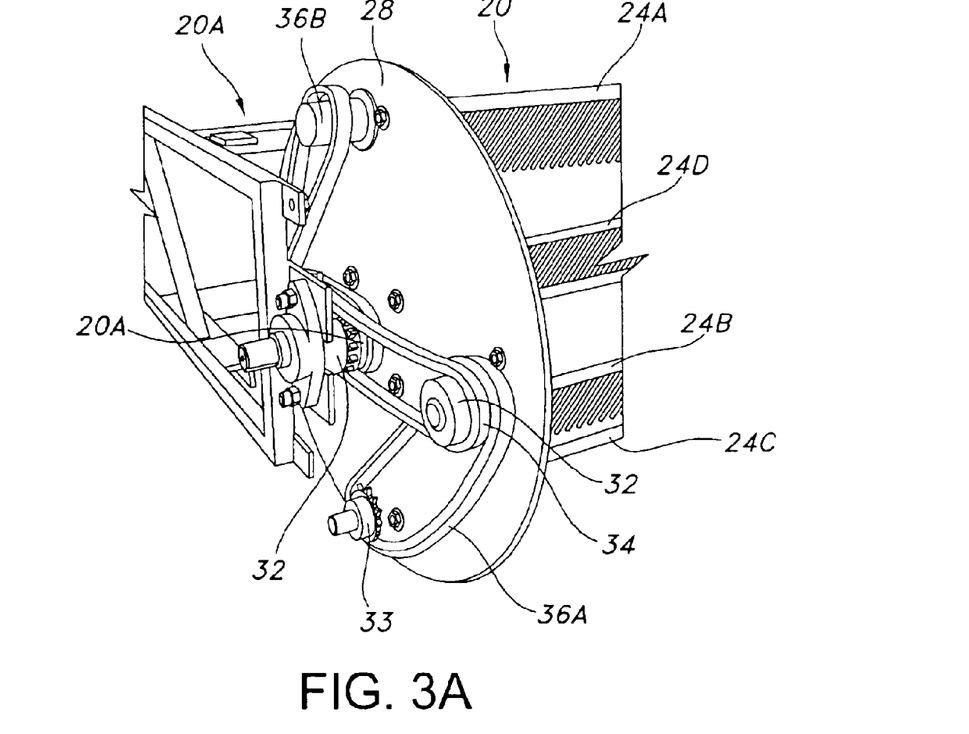
FIG. 3A is a perspective view of the rake head, illustrating its mounting on the frame and the system of power transfer to the rake head and the rakes.
Figure 3B:
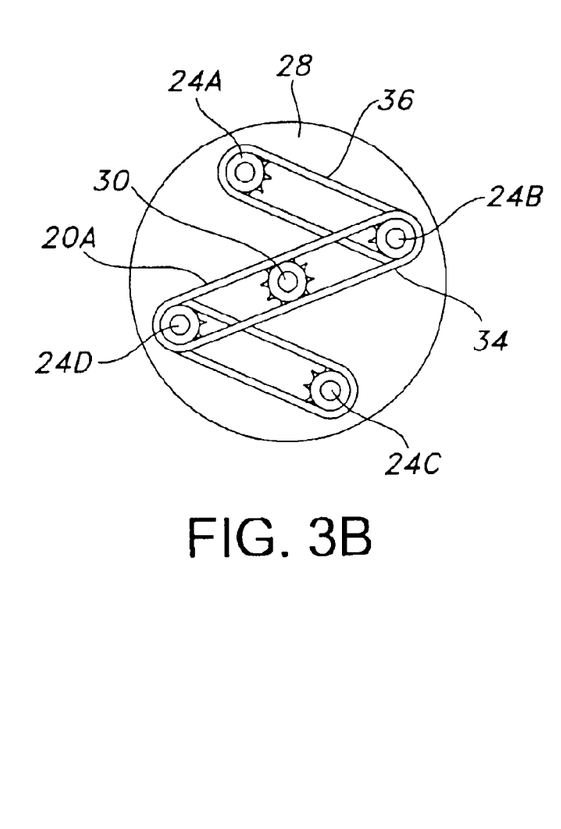
FIG. 3B is a side view of the power-drive end of the rake head, illustrating the interconnected drive means for the center head shaft and the individual rakes.
Figure 3C:
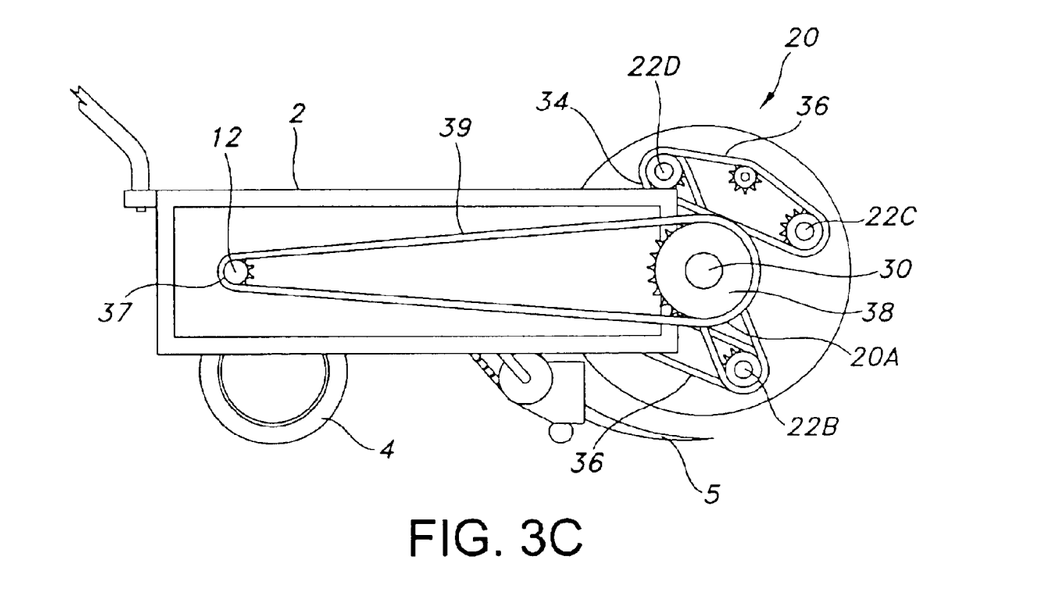
FIG. 3C is a side view of the harvester, illustrating the transfer of power from the rake-head drive shaft to the rake head.

FIGS. 3A–3C illustrate a rake-head drive 20A means for driving the rake head 20 and the rake bars 22. In these illustrations, the frame 2 is shown either not at all or only incompletely for purposes of illustration. The rake head 20 is mounted on the frame 2 by means of the center head shaft 30. The rake-head drive means 20A comprises gear and/or chain-and-sprocket assemblies to drive the rotation of the rake head 20 as well as control the orientation of the rakes 22. In the embodiment shown, chain-and-sprocket assemblies are used, although it is understood that a system of gears or gears with chains may also be used. As shown in FIG. 3A, the center head shaft 30 and the rake bars 24 are mounted in the end flange 28. The rake bars are differentiated now as 24A–24D. A double-track sprocket 32 is mounted on the end of the center head shaft 30 and two of the rake bars 24B and 24D, whereby the sprocket assembled at the end of rake bar 24D is not visible. A first rake-bar drive chain 34 is assembled on a first track of the double-track sprockets 32. Single sprockets 33 are mounted on rake bars 22A and 22C. A second rake-bar drive chain 36A is assembled on a second track of the double-track sprocket 32 on rake bar 24B and on the single sprocket 33 at the end of rake bar 22C. Similarly, a third rake-bar drive chain 36B is assembled on the second track of the double-track sprocket 32 at the end of rake bar 24D and on the single sprocket 33 of rake bar 24A. FIG. 3B is a side view of the end flange 28, showing the interconnected arrangement of the chains 34, 36A, 36B.

FIG. 3C is a side view of the rake head 20, mounted on the frame 2, showing the power transmission from a rake-head drive shaft 12 to the rake-head drive means 20A. As shown, a gear 38 is mounted on the end of the center head shaft 30 and a rake-head drive chain 39 is assembled on the gear 38 and a first rake-head sprocket or gear 37 mounted on the end of the rake-head drive shaft 12. The rake-head drive shaft 12 will be discussed in greater detail below.

As mentioned earlier, the rake bar 24 is constructed to rotate about its longitudinal axis so as to maintain a constant sloping angle of the rake teeth 26, regardless of the instantaneous circumferential location of the rake bar 24 in the rotational cycle of the rake head 20. Ideally, if more than one rake 22 is mounted on the rake head 20, the teeth on each rake 22 deflect from the vertical to the same degree and direction. This parallel orientation of the rake teeth 26 of the individual rakes 22 is best seen in FIG. 3A. As the center head shaft 30 is rotated by means of the rake-head drive chain 39 and the gear 38, the rake bars 24 are each forced to rotate about their longitudinal axes by means of the interconnected arrangement of the rake-head drive means 20A described above.

Figure 4:
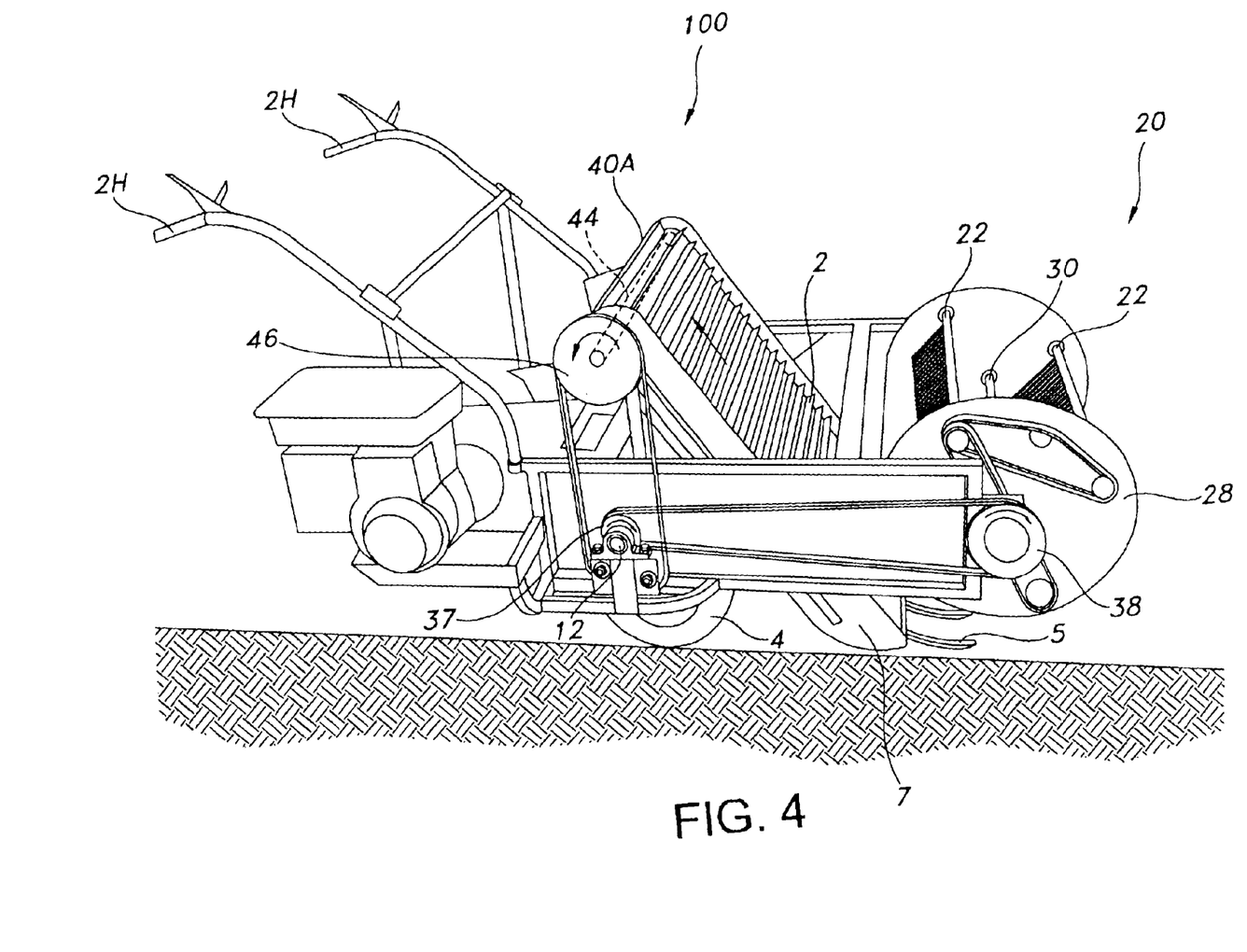
FIG. 4 is a perspective view of the harvester, ullustrating power transfer to the conveyor.

FIG. 4 shows the conveyor 40 and a conveyor drive means 42 that controls the operation of the conveyor 40 and its operating speed. The conveyor 40, a wide, flexible, ridged belt made of a rigid synthetic material, is mounted just rearward of the rake head 20. A conveyor-drive shaft 44 that is splined or toothed over at least a portion of it extends into the conveyor 40 at its upper end 40A, meshes with a mating geometry of the inside of the upper end 40A, and drives the conveyor 40 directly. The rake-head drive shaft 12, as well as the rake head 20 and rakes 22 rotate in a forward direction, while the conveyor travels in a rearward direction. Thus, the direction of rotation of the conveyor-drive shaft 44 has to be opposite the direction of rotation of the rake-head drive shaft 12. This is accomplished by running a conveyor-drive chain 45 around a direction-reversing sprocket assembly 48, which includes a first sprocket 48A and a second sprocket 48B, and around the first rake-head gear 37, as shown in FIG. 4. With the arrangement shown, the drive power to the rake head 20 and the conveyor 40 is provided by the rotation of the first rake-head gear 37. Thus, the speed of the conveyor 40 is attuned to the rotational speed of the rake head 20; the faster the rake head 20 rotates, the faster the conveyor 40 runs.

Figure 5:
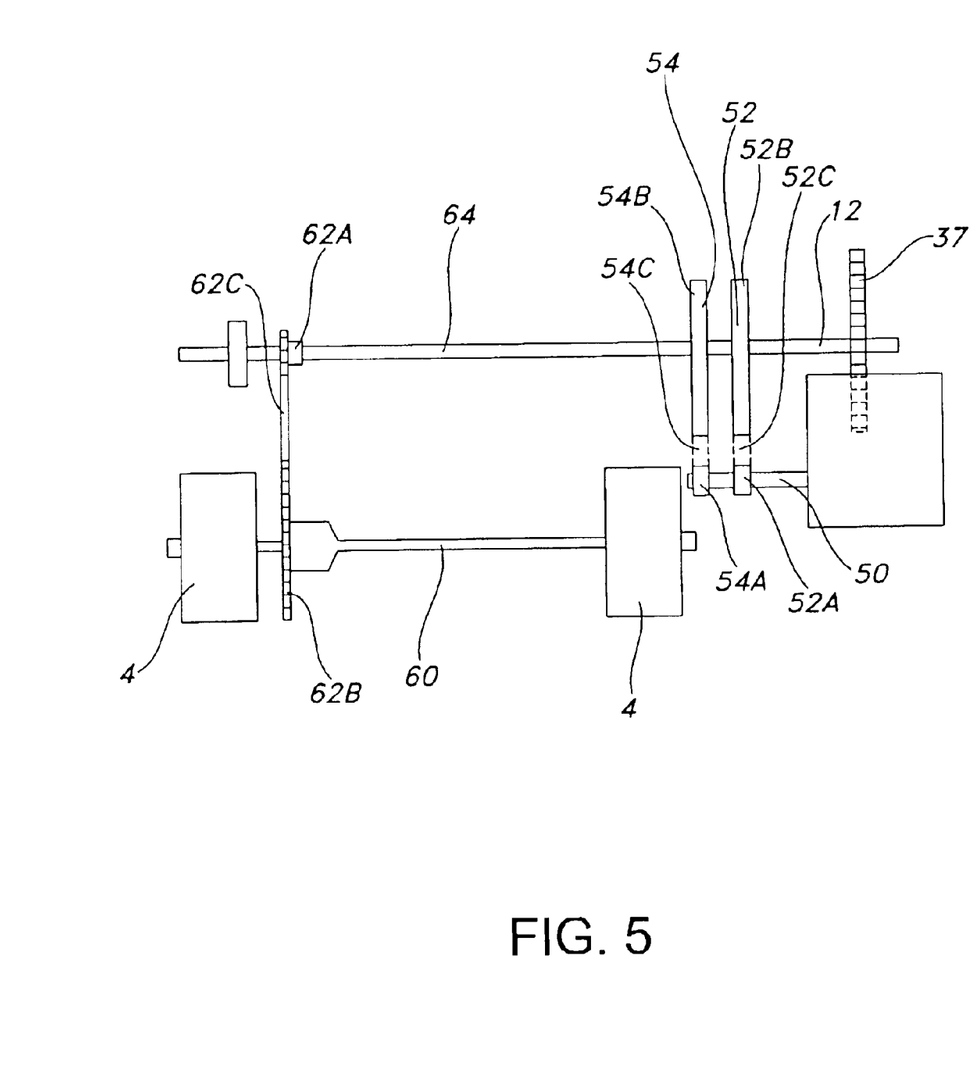
FIG. 5 is a schematic illustration of power transfer from the motor to the rake head and to the ground-travel wheels.

FIG. 5 is a schematic illustration of the power take-off from the motor M. The motor M is mounted on a support attached to the frame 2, neither of which is shown in this FIG. A power shaft 50 comes off the motor M and provides the force to drive the wheels 4, the rake head 20, and the conveyor 40. In the embodiment shown, a first belt-and-pulley assembly 52 provides the power to the rake head 20 and the conveyor 40, and a second belt-and-pulley assembly 54 provides power to the ground-travel drive wheels 4. Mounted on the power shaft 50 are two driver pulleys 52A, 54A. A central drive shaft 64 extends across a substantial portion of the width of the berry harvester 100, parallel to the power shaft 50. Mounted on one end of the central drive shaft 64 is a first transfer pulley 52B. A second transfer pulley 54B is mounted on a second end 12B of the rake head drive shaft 12, which is mounted on the central drive shaft 64. The transfer pulleys 52B, 54B are drivably linked to the driver pulleys 52A and 54A by corresponding pulley belts 52C, 54C. With continued reference to FIG. 5, an axle 60 connects the two drives wheels 4. The axle 60 runs parallel to the central drive shaft 64. Mounted on the central drive shaft 64 is a first gear 62A; mounted on the axle is a second gear 62B. A gear chain 62C links the first and second gears 62A,62B and selectively engages the second gear 62B. When the second gear 62B is engaged, power is transmitted to the drive wheels 4.

When the motor M is turned on, the central drive shaft 64 rotates at a constant speed. Tightening one or both of the pulley belts 52C, 54C causes the corresponding transfer pulleys 52B, 54B to rotate. Each of the two driver pulleys 52A, 54A is drivable, independent of the other. Thus, it is possible to engage the first belt-and-pulley assembly 52, ie., to operate the rake head 20 and the conveyor 40, while leaving the second belt-and-pulley assembly 54 that engages the ground-travel drive wheels 4 disengaged. The opposite is also the case. It is possible to engage the ground-travel drive wheels 4, so as to maneuver the harvester 100 across the ground surface, while leaving the rake head 20 and conveyor 40 disengaged.

Figure 6:
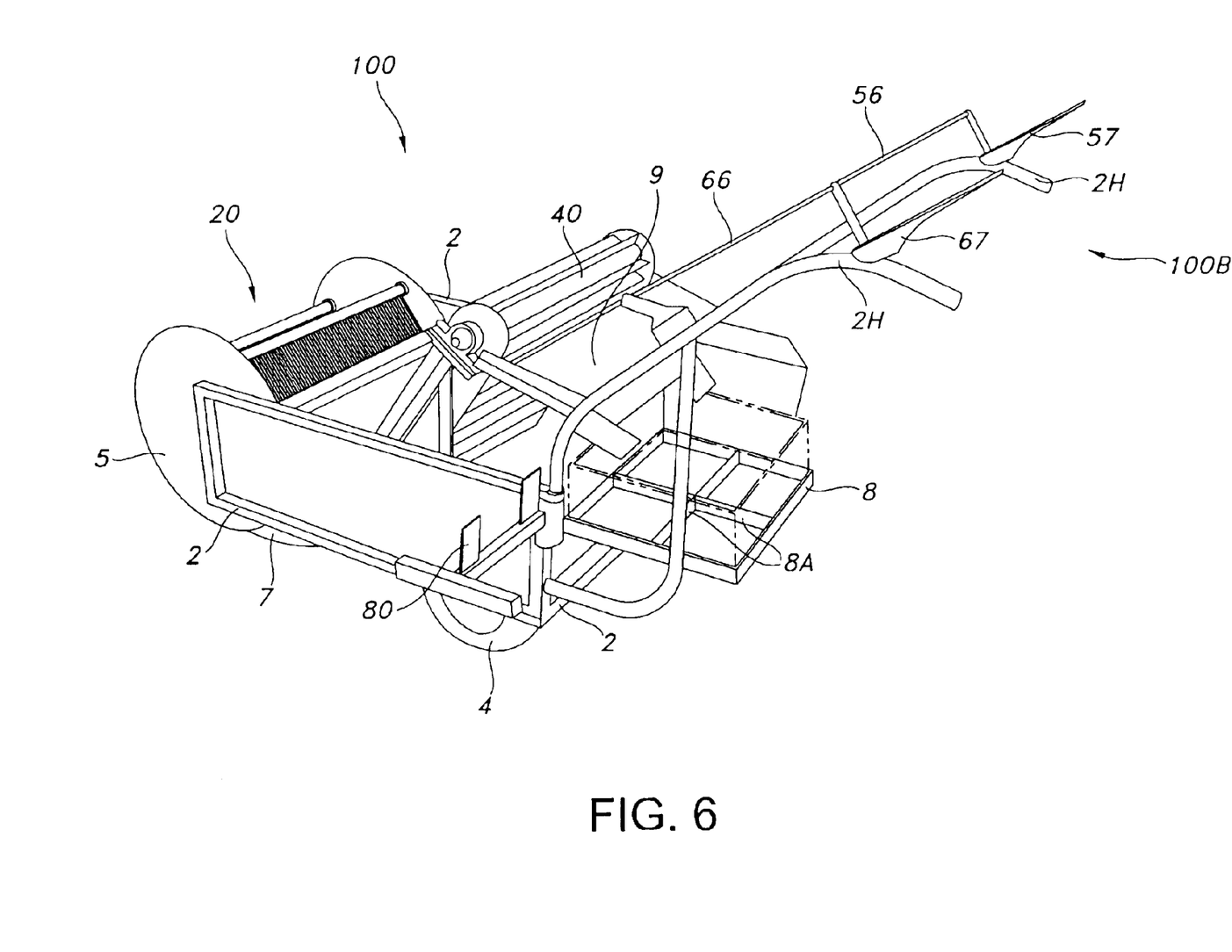
FIG. 6 is a perspective view of the harvester, from the rear, illustrating the belt-tensioner cables and actuators, the support area for the berry collection box, and the supplemental-box mount.

FIG. 6 is a perspective view of the berry harvester 100, as seen from the rearward end 100B. Extending upward from the frame 2 are handles 2H. Mounted on one handle 2H is a first belt tensioner mechanism 57 and on the other handle 2H a second belt tensioner 67. The first belt tensioner mechanism 57 serves to engage the first belt-and-pulley assembly 52 and the second belt tensioner mechanism 67 engages the second belt-and-pulley assembly 54. The first belt tensioner mechanism 57 includes a first pulley cable 56 that is attached to the first belt-and-pulley assembly 52 and when the belt tensioner mechanism 57 is depressed, the belt 52C is tightened on the belt-and-pulley assembly 52 and power is transmitted to the rake-head 20 and the conveyor 40. The second belt-tensioner mechanism 67 includes a second pulley cable 66 that is attached to the second belt-and-pulley assembly 54 and, when depressed, the belt 54C is tightened on the second belt-and-pulley assembly 54 and power is transmitted to the ground-travel drive wheels 4. The first and second belt tensioner mechanisms 57,67 are designed such that they are easy to use when the operator is handling the harvester 100. By simply letting go of one or the other belt tensioner mechanism on the handle, the corresponding belt-and-pulley assembly is immediately disengaged, resulting in immediate stopping of the corresponding rake head and/or ground-travel drive wheels. Thus, to interrupt all operation of the harvester 100, both the first and second belt-and-pulley assemblies 52,54 are immediately disengaged when the operator lets go of both handles 2H. This is a strong safety feature, as it prevents operation of the harvester 100 without operator control.

Also shown in FIG. 6 is the chute 9 that aids in guiding berries from the conveyor 40 into a berry collection box that is positionable on the support area 8. In the embodiment shown, the support area 8 is constructed as a metal frame that holds the conventional berry collection box, which has a contoured bottom. Divider plates 8A are provided in the support area 8 that jut into the contours on the bottom of the box. The support area 8 shown here is designed to firmly and securely hold the berry collection box yet not add any more weight than necessary to the harvester 100. For that reason, it is constructed of metal tubing, although it is understood other designs and constructions of the support area 8 may well be suitable for holding a berry collection box and are included within the scope of the present invention. A supplemental-box mount 80 that is attached to the frame 2 of the harvester 100 is also shown in FIG. 6. Again, the supplemental-box mount 80 is designed to add as little weight as possible to the harvester 100 and other designs are possible. The particular embodiment of the supplemental-box mount 80 shown is a simple structure designed to fit into the contours on the bottom of the conventional berry collection box. The berry collection boxes are stackable upon each other, and any number of berry collection boxes is stackable on the box mount 80. The box mount 80 provides a simple and convenient means for the operator of the berry harvester 100 to carry extra berry collection boxes while processing a field. This allows the operator to set aside a full berry collection box for later pick-up and quickly and easily replace it with a fresh box.

It is understood that the embodiments described herein are merely illustrative of the present invention. Variations in the construction of the harvester may be contemplated by one skilled in the art without limiting the intended scope of the invention herein disclosed and as defined by the following claims.

What is claimed is:

1. Apparatus for raking berries, said apparatus comprising:

a frame assembled on wheels, said frame having a forward end and a rearward end;

a rake head rotatably mounted on said forward end of said frame, said rake head having a plurality of rakes, wherein each rake of said plurality of rakes has a rake orientation that remains constant relative to a vertical plane when said rake head is rotating;

a berry-conveyance means mounted in said frame rearward of said rake head; and a main drive means for driving said wheels, said rake head, and said berry-conveyance means.

2. The apparatus of claim 1, wherein said rake head includes a rake-head shaft and a rake-head flange mounted at each end of said head shaft, wherein said head shaft is mounted centrally in each said rake-head flange;

wherein said each rake is mounted on said rake-head flange so as to extend parallel to and radially displaced from said rake-head shaft; and wherein said rakes are spaced evenly about said rake-head flange equidistant from said rake-head shaft.

3. The apparatus of claim 2, wherein said rake comprises a rake bar with a plurality of teeth that extend in a row radially from said rake bar.

4. The apparatus of claim 2, wherein said a rake drive system is coupled to said main drive means, said rake drive system including a first rake-head drive means for driving said rake head and a second rake drive means for driving each said rake of said plurality of rakes;

wherein said first rake-head drive means drives said rake head to rotate at a head speed that is relative to a ground travel speed of said frame; and wherein said second rake-head drive means drives said each rake to rotate at a rake speed that is relative to said head speed so as to maintain a constant orientation of said rake relative to said vertical plane while said rake head rotates through a complete rotation.

5. The apparatus of claim 4, wherein said rake drive system includes a conveyor drive means for driving said berry-conveyance means.

6. The apparatus of claim 1 further comprising a control mechanism that is actuatably linked to said main drive means so as to control an on/off state of said main drive means.

7. The apparatus of claim 1, wherein said main drive means is a motor that drives a drive shaft; and wherein a first power-coupling means is provided to link said main drive means with said rake head and a second power-coupling means provided to link said main drive means with said drive wheels.

8. The apparatus of claim 7 further comprising a first control mechanism and a second control mechanism, each mounted separately on said frame;

wherein said first control mechanism is actuatably linked to said first power-coupling means and said second control mechanism is actuatably linked to said second power-coupling means, so as to provide separate controllability of said first power-coupling means and said second power-coupling means.

* * * * *